Aug. 15, 1939. M. E. LANGE ET AL 2,169,764
MACHINE TOOL
Original Filed July 17, 1935 9 Sheets-Sheet 4
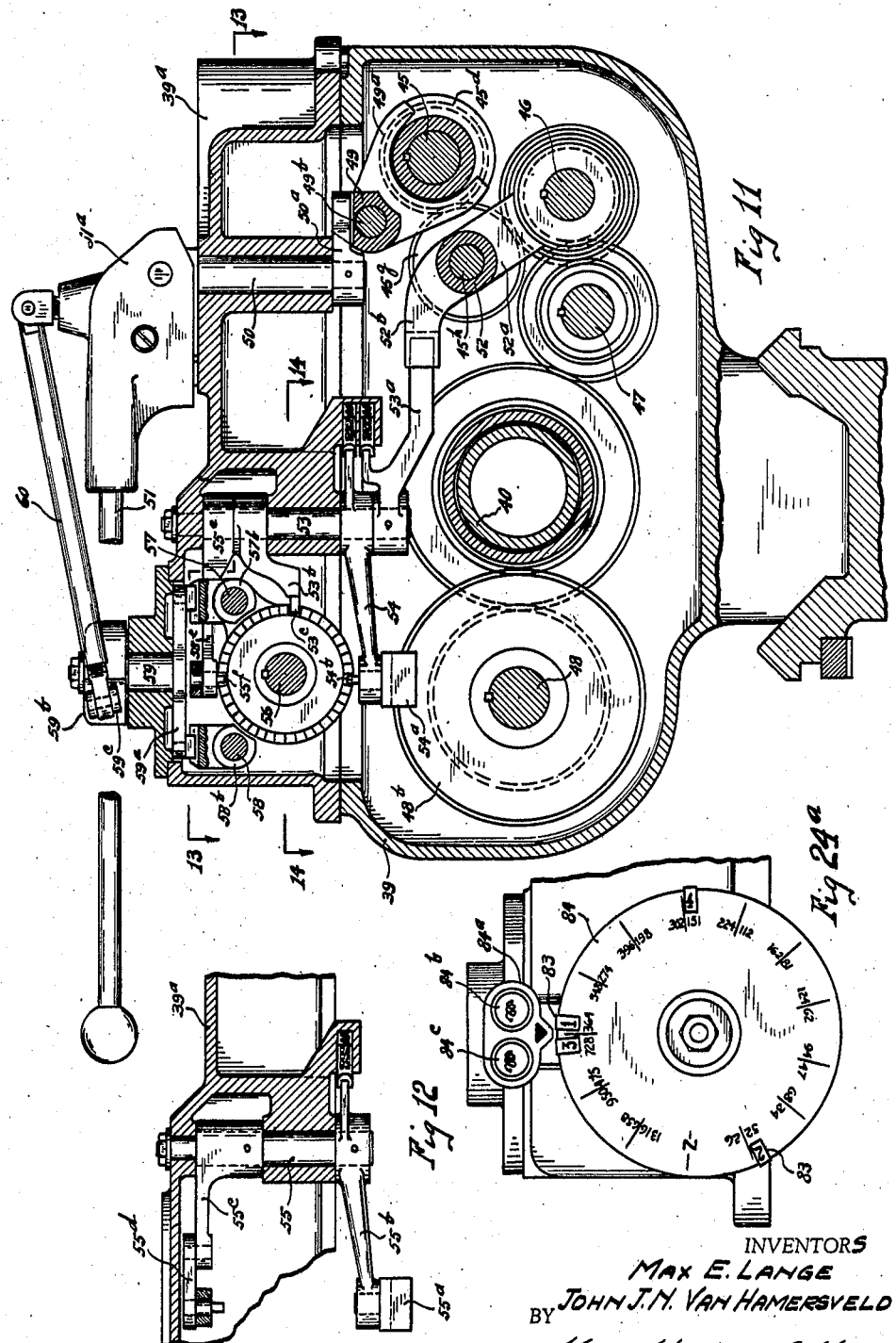
INVENTORS
MAX E. LANGE
JOHN J.N. VAN HAMERSVELD
BY
Kwis, Hudson & Kent
ATTORNEYS

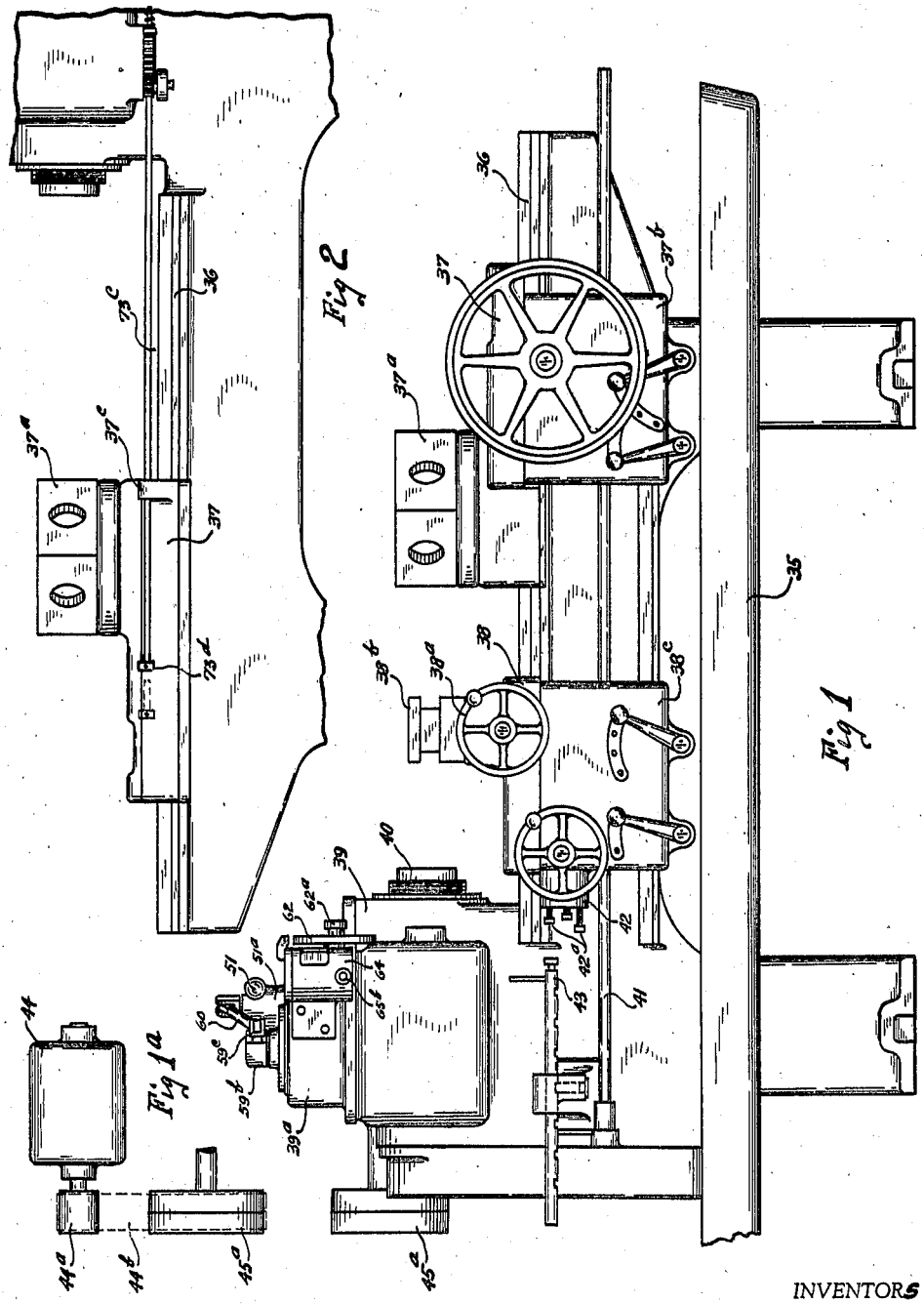

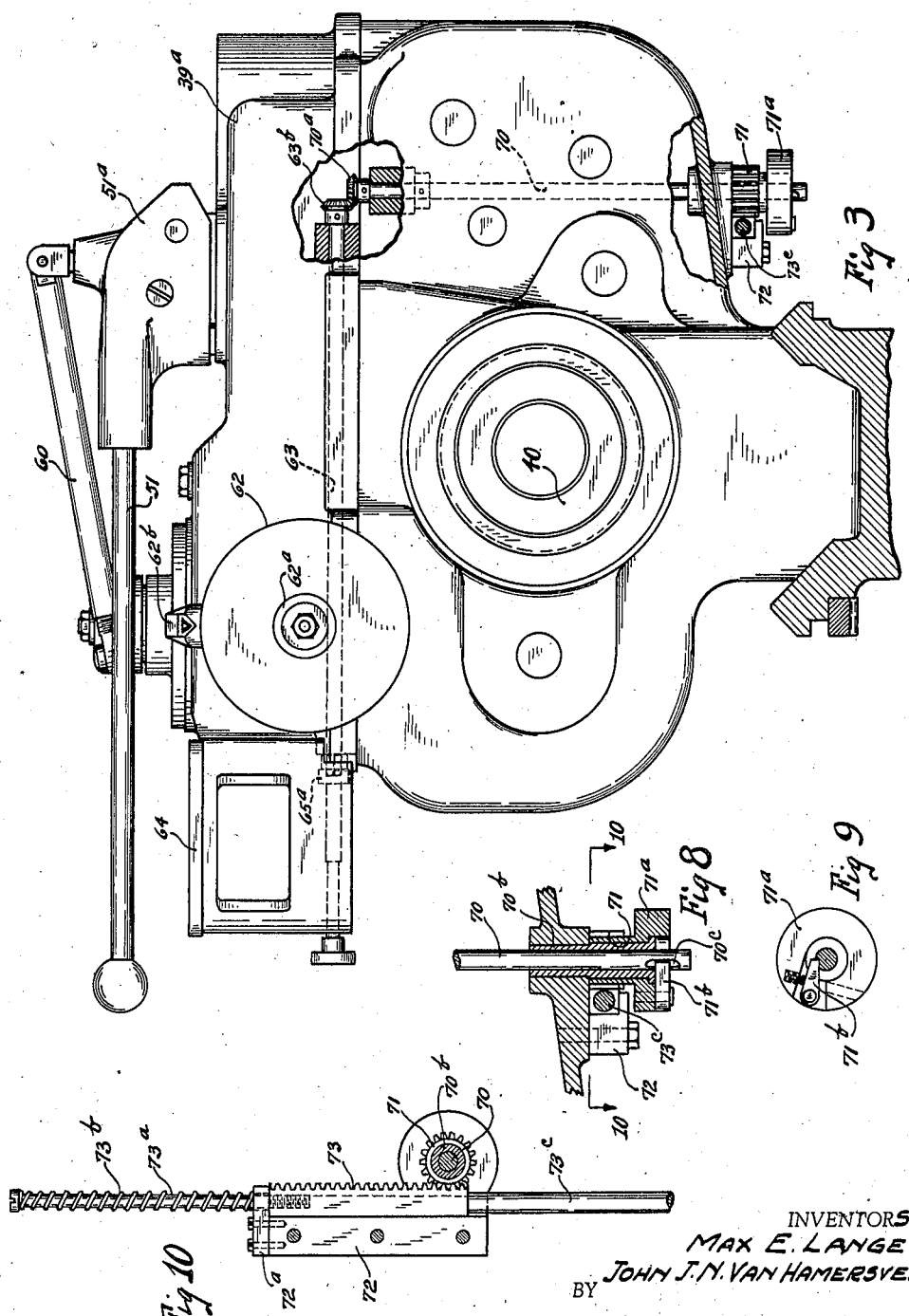

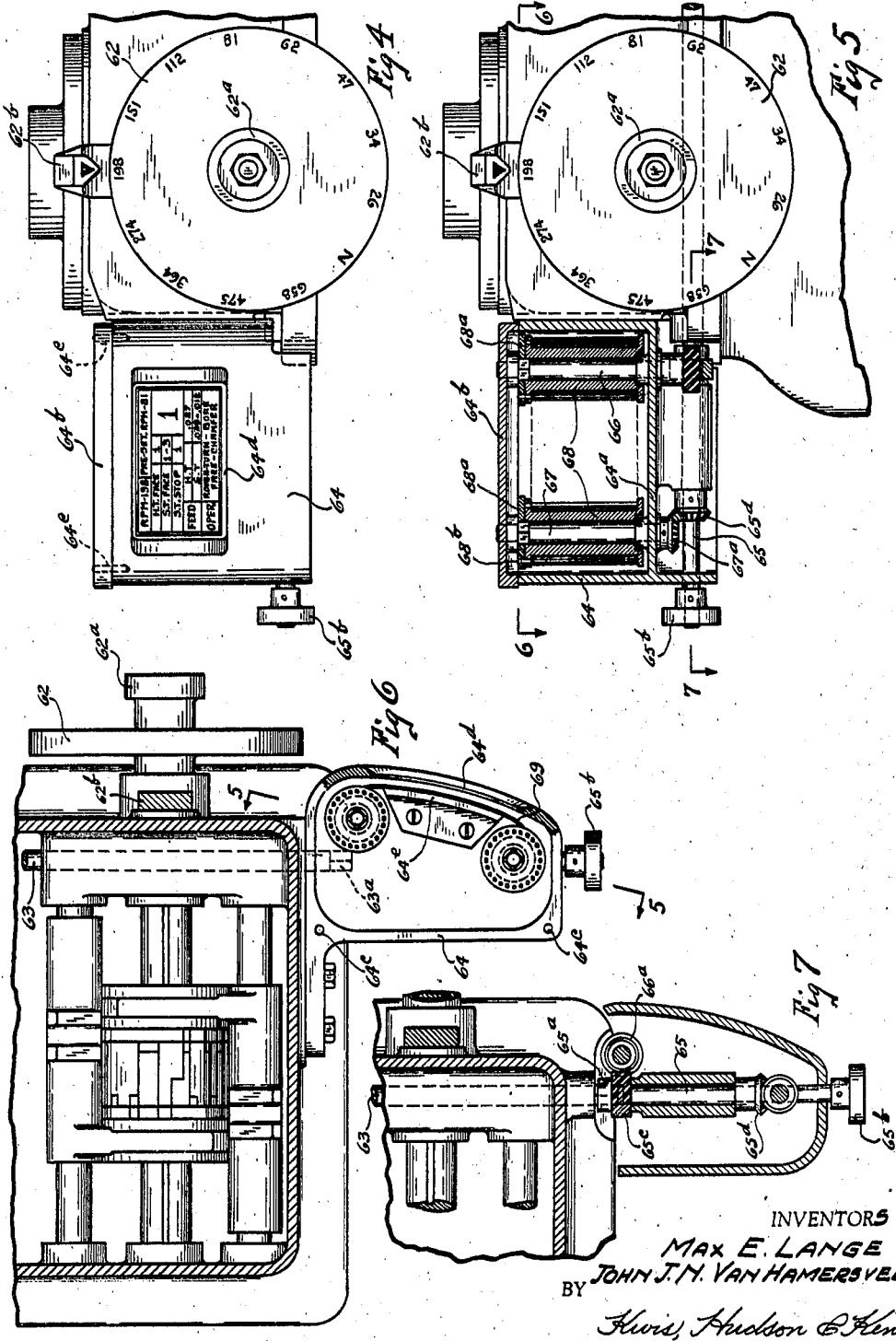

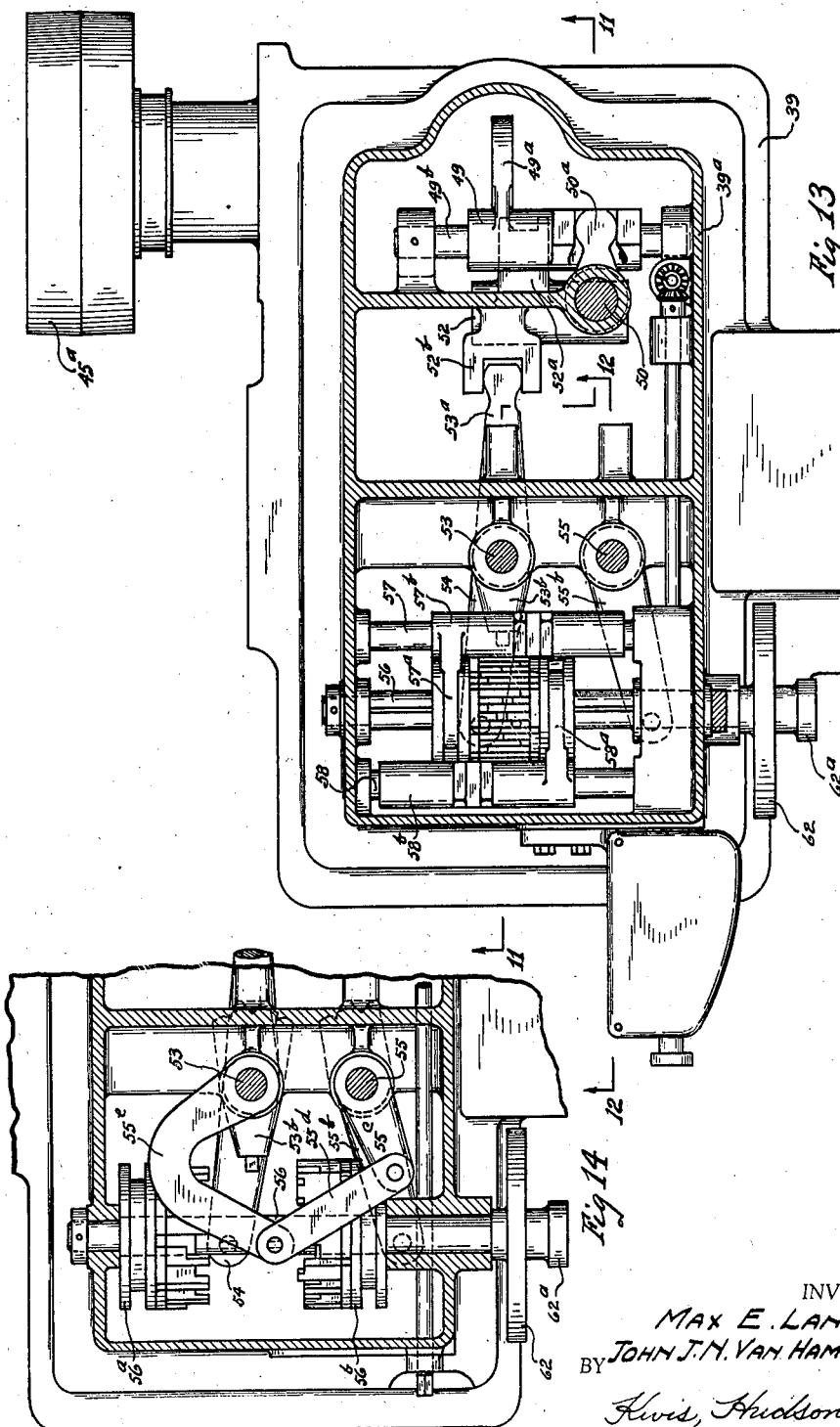

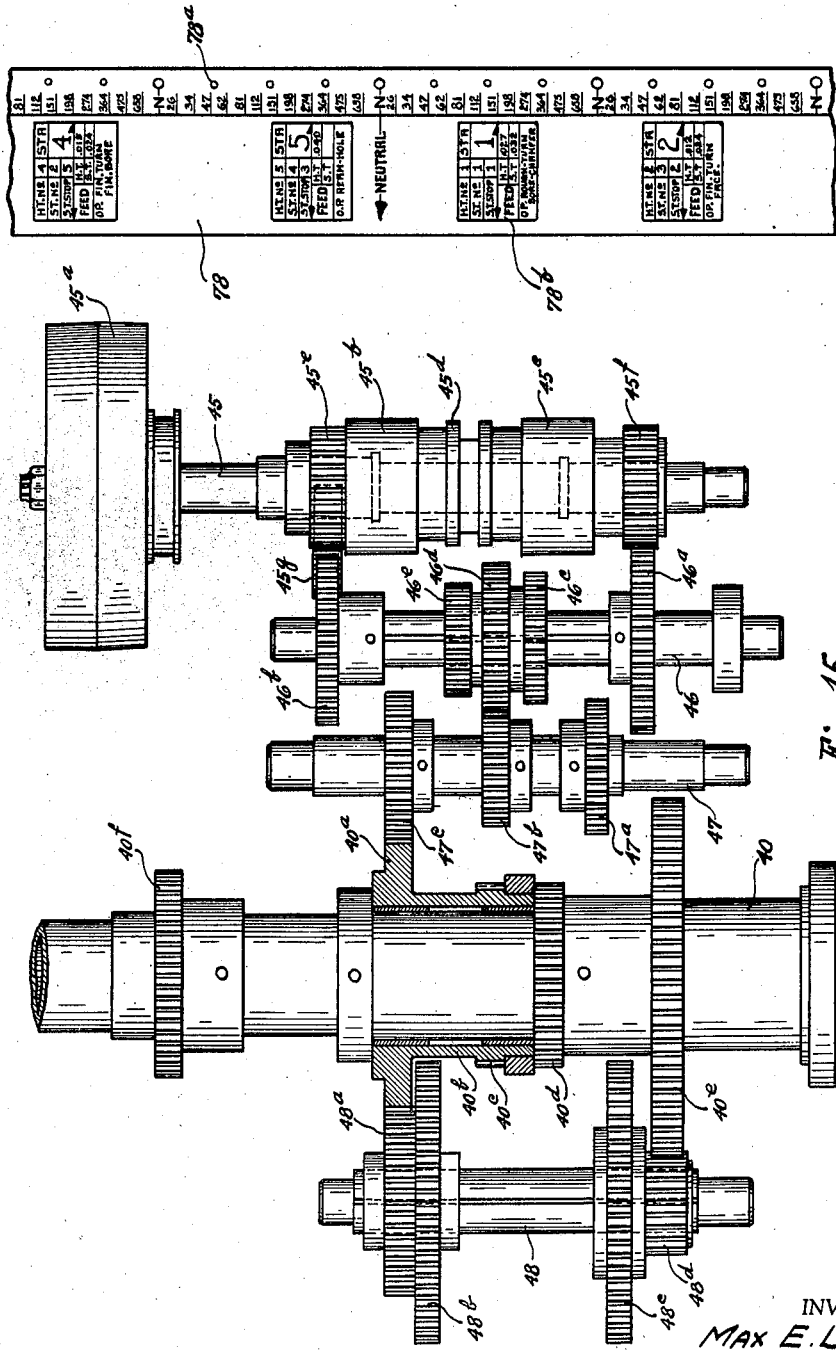

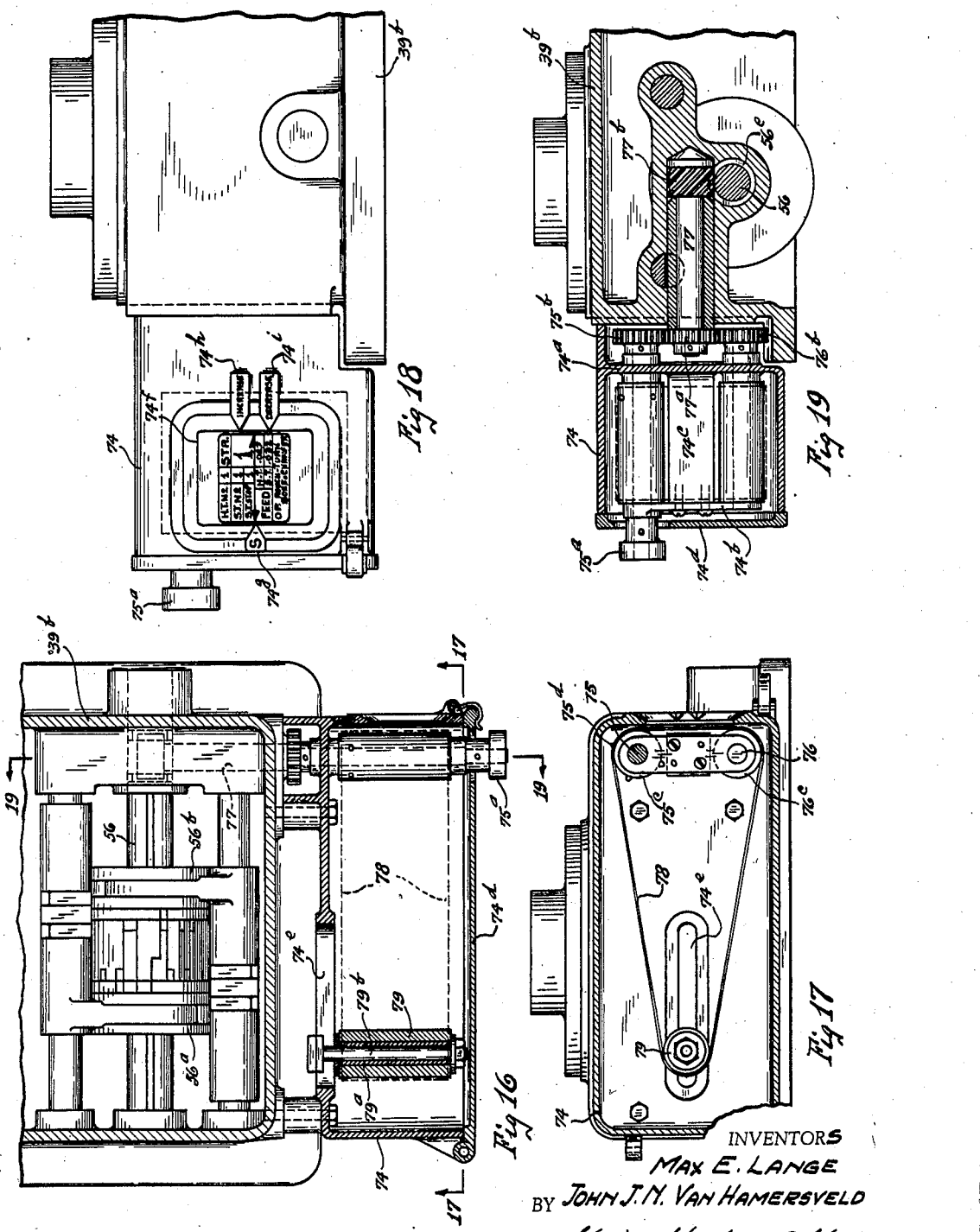

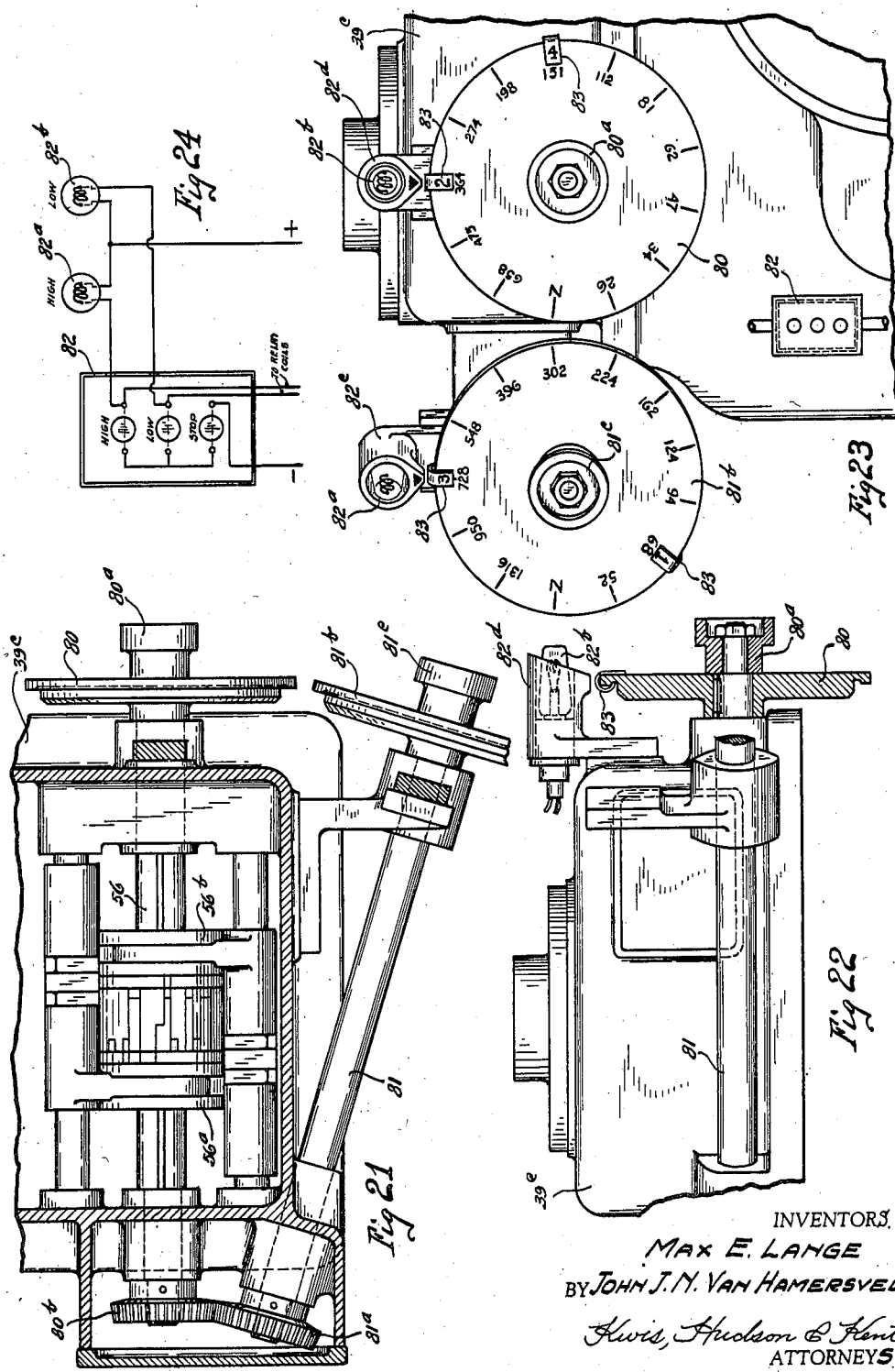

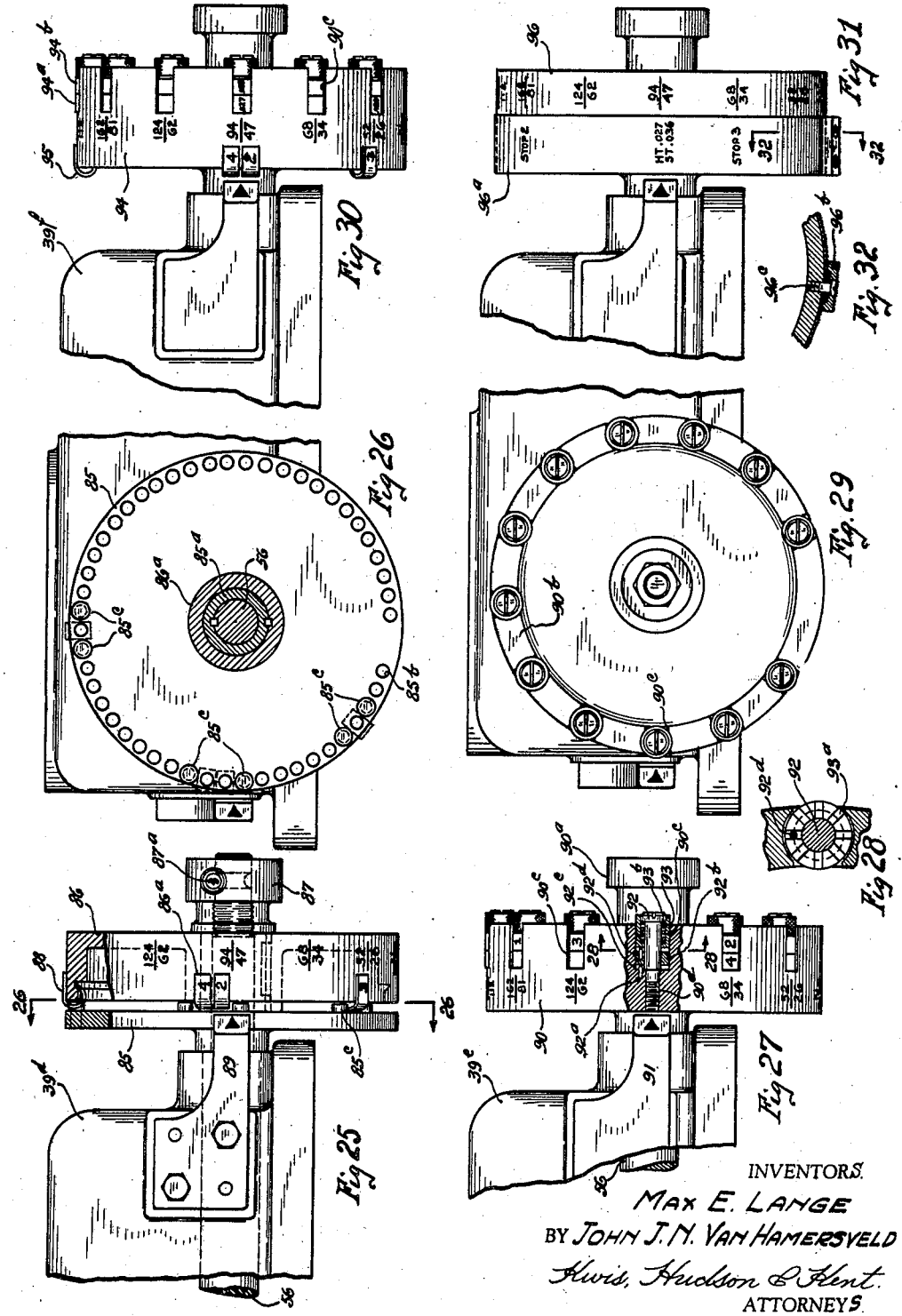

Patented Aug. 15, 1939

2,169,764

UNITED STATES PATENT OFFICE 2,169,764

MACHINE TOOL

Max E. Lange and John J. N. Van Hamersveld, Cleveland Heights, Ohio, assignors to The Warner & Swasey Company, Cleveland, Ohio, a corporation of Ohio Application July 17, 1935, Serial No. 31,854
Renewed June 16, 1939

35 Claims. (Cl. 29—46)

This invention relates to a machine tool of the type having one or more movable members to be operated at varying speeds and/or rates of feed.

Heretofore it has been customary shop practice to furnish the operator of a machine tool with an instruction sheet or drawing giving the necessary information to enable the operator to produce a work piece upon the machine, such information may include for example, the different spindle speeds, rates of feed, limit stops for positioning the moving parts, turret settings and the like to be used in the different sequential operative steps in the complete operative cycle for the production of the work piece, as well as the character of the work to be performed, such as, turning, facing, boring, reaming, tapping, chamfering and the like. These instruction sheets or drawings are not only apt to be misplaced and may become illegible through accumulating grease and dirt thereon, but since they contain the necessary information for each step in the complete operative cycle they are often bulky and confusing to the operator, causing him to proceed slowly, thus resulting in an inefficient operation of the machine.

An object of the present invention is to provide in a machine tool means which is incorporated into the machine as a part thereof, and which visually indicates to the operator the information necessary for him to operate the machine in the different sequential steps of the operative cycle for the production of a work piece, thus increasing the operating efficiency of the machine.

Another object is to provide in a machine tool means for visually indicating in sequence to the operator the information required for operating the machine in the various operative steps in a work cycle, and which means is operatively associated with one of the movable parts of the machine.

Another object of the invention is to provide in a machine tool means for visually indicating sequentially to the operator the information pertaining to the operation of the machine for the different steps in the complete operative cycle, which means is movable and has an operative relation to the speed changing mechanism of a movable part of the machine, such that when said means is moved to disclose the information relative to the next operative step in the cycle, the required speed for said part in the next cycle is automatically preselected.

Another object is to provide in a machine tool means for sequentially and step by step indicating visually to the operator the information required for the different operative steps in the complete work cycle, which means is moved step by step through an operative association with one of the movable parts of the machine as the said part attains a predetermined position in its movement during each operative step.

Another object is to provide in a machine tool movable means for controlling the speed of operation of a movable part of the machine for the different steps in the operative cycle and which means is provided with members visually representing the different operative steps in the complete cycle and indicating the various positions to which said means should be moved in said different operative steps.

Another object is to provide in a machine tool movable means for visually indicating to the operator information necessary for the operation of the machine for the production of a work piece and including members showing the different positions to which said means should be moved for the different operative steps in the complete cycle, together with provision for locking said members in the proper position upon said means, wherefore the operator cannot alter the positions of said members.

Another object is to provide in a machine tool means movable to control the speed of operation of a movable part of the machine, which means bears indicia indicating the positions it should be moved to to obtain the different changes in speed for said part, together with movable members positioned on said means and cooperating with the indicia thereon for indicating the various operative steps in the complete cycle which are to employ the different speeds of operation for the said movable part of the machine.

Another object is to provide in a machine tool a movable member operatively associated with a movable part of the machine and adjustable to control the speed of operation of said part and bearing indicia indicating the different positions of adjustment for obtaining the different speeds of operation of said part, which member is provided with adjustable means for indicating the different operative steps in the complete cycle at which the various speeds of operation should be imparted to said movable part, and is also provided with adjustable members for indicating the rates of movement of another movable part or parts of the machine during each operative step of the complete cycle.

Another object is to provide in a machine tool employing a multiple speed motor as the prime mover for a movable part thereof, together with change speed mechanism for operating said part at various different speeds of operation, means for controlling said change speed mechanism and including two corelated movable members, each bearing indicia indicating the speeds of operation for said part, the indicia on one of said members representing the speeds of operation of said part when said motor is operating at one of its speeds, and the indicia on the other of said members representing the speed of operation of said part when said motor is operating at another of its speeds, and adjustable means associated with said members to indicate the different operative steps in a complete work cycle, at which certain speeds of operation will be used for said part, together with visual means associated with each of said members and connected with the control means for said motor to indicate the setting thereof and the speed at which the motor is running.

Further and additional objects and advantages will become apparent hereinafter during the detailed description which is to follow of several embodiments of the invention, which embodiments are illustrated in the accompanying drawings and by way of example are shown as applied to a turret lathe, and wherein—

Fig. 1 is a front elevational view of a turret lathe embodying one form of the present invention.

Fig. 1a is a fragmentary view on a reduced scale showing the motor drive.

Fig. 2 is a fragmentary rear elevational view of the lathe shown in Fig. 1.

Fig. 3 is an end elevational view of the head stock of the lathe shown in Fig. 1 and is taken looking from the right hand side of Fig. 1 and is on an enlarged scale.

Fig. 4 is a fragmentary detail end elevation of a portion of the head stock shown in Fig. 3 and is on a somewhat larger scale than Fig. 3.

Fig. 5 is a view similar to Fig. 4, that is, it is an elevational view looking from the right toward Fig. 6, but showing certain parts in section, the section being taken along the line 5—5 of Fig. 6 looking in the direction of the arrows.

Fig. 6 is a horizontal sectional view taken substantially on line 6—6 of Fig. 5 looking in the direction of the arrows.

Fig. 7 is a fragmentary horizontal sectional view taken substantially on line 7—7 of Fig. 5 looking in the direction of the arrows.

Fig. 8 (Sheet 2) is a fragmentary detail sectional view of a portion of the machine as illustrated in Fig. 3.

Fig. 9 (Sheet 2) is a detached bottom end view of a part of the portion of the machine shown in Fig. 8 with one of the parts thereof shown in section.

Fig. 10 (Sheet 2) is a sectional view taken substantially on line 10—10 of Fig. 8 looking in the direction of the arrows.

Fig. 11 (Sheet 4) is a transverse vertical section through the head stock of the lathe shown in Fig. 3, and is taken substantially on line 11—11 of Fig. 13 looking in the direction of the arrows.

Fig. 12 is a fragmentary vertical section taken substantially on line 12—12 of Fig. 13 looking in the direction of the arrows.

Fig. 13 (Sheet 5) is a horizontal irregular sectional view through the head stock and is taken substantially on line 13—13 of Fig. 11 looking in the direction of the arrows.

Fig. 14 is a fragmentary horizontal sectional view taken substantially on line 14—14 of Fig. 11 looking in the direction of the arrows, certain parts being shown in elevation.

Fig. 15 (Sheet 6) is a diagrammatic plan view of the change speed gears for the spindle drive in the head stock.

Fig. 16 (Sheet 7) is a horizontal sectional view similar to Fig. 6, but illustrating a different form of the invention from that shown in Fig. 6.

Fig. 17 is a vertical sectional view taken substantially on line 17—17 of Fig. 16, looking in the direction of the arrows.

Fig. 18 is a front elevation looking at the right of Fig. 16 and is similar to Fig. 4, but illustrating the form of the invention shown in Fig. 16.

Fig. 19 is a vertical sectional view taken substantially on line 19—19 of Fig. 16 looking in the direction of the arrows.

Fig. 20 (Sheet 6) is a detached developed view of a portion of the production log employed in the form of the invention illustrated in Figs. 16 to 19 inclusive.

Fig. 21 (Sheet 8) is a view similar to Figs. 6 and 16, but illustrates a still different form of the invention from those shown in said figures.

Fig. 22 is a front elevation of a portion of the head stock shown in Fig. 21, with certain parts removed and other parts shown in section.

Fig. 23 is an end elevation of a portion of the head stock shown in Fig. 21, and is taken looking on the right hand side of said figure, and corresponds to Figs. 4 and 18.

Fig. 24 is a wiring diagram of a portion of the circuit for the motor, motor control and the signal lights used in the embodiment of the invention shown in Figs. 21 to 23 inclusive.

Fig. 24a is a detached end elevational view of the head, showing a modified form of the invention as illustrated in Fig. 23.

Fig. 25 (Sheet 9) is a fragmentary front elevational view of a part of the head stock, with certain portions shown in section and illustrates a modified form of construction from what has been previously illustrated.

Fig. 26 is a vertical sectional view taken substantially on line 26—26 of Fig. 25, looking in the direction of the arrows.

Fig. 27 is a view similar to Fig. 25 but illustrating a more modified form of construction than is shown in said Fig. 25.

Fig. 28 is a detail fragmentary sectional view taken substantially on line 28—28 of Fig. 27 looking in the direction of the arrows.

Fig. 29 is an end elevational view of Fig. 27 and is taken looking from the right hand side of said figure.

Fig. 30 is a view similar to Fig. 27 but illustrating a slightly different form of construction than is shown in Fig. 27.

Fig. 31 is a view similar to Figs. 25, 27 and 30, but illustrates another variation in the construction shown in said figures.

Fig. 32 is a fragmentary sectional view taken substantially on line 32—32 of Fig. 31 looking in the direction of the arrows.

It should be understood that although the various embodiments of the invention illustrated herein are shown as applied to a turret lathe, that the invention is applicable to other types of machine tool having one or more movable members to be operated at varying speeds and/or rates of feed.

The machine tool illustrated in the drawings is a turret lathe, as previously stated, and comprises a bed 35 provided, in this instance, with horizontal ways 36 upon which the turret slide or saddle 37 travels as does also the carriage 38 for the cross-slide which is mounted for slidable movement between the turret slide or saddle and the head stock 39 in which is rotatably arranged the work spindle 40 of the machine. The turret slide or carriage 37 is shown in the present illustration as carrying a hexagonal indexible turret 37a, while the cross-slide 38a on the cross-slide carriage 38 is illustrated as provided with an indexible square turret 38b. As is customary in machines of this type, the movements of the turret slide and of the cross-slide carriage along the ways 36 of the bed are imparted thereto by means of a feed shaft 41, which is operatively connected with the work spindle, wherefore the turret slide and cross-slide can be fed in direct relation to the speed of rotation of the work spindle as will be well understood. The rate of feeding movement of the turret slide 37 and the cross-slide 38 can be varied by means of change speed gearing carried by the aprons 37b and 38c, respectively, such gearing being controlled by means of the customary control levers on the front of the aprons. The cross-slide carriage is provided with a manually indexible stop roll 42, carrying a plurality of adjustable abutment screws 42a, which are adapted to abut with an adjustable stop rod 43 functioning in the customary manner.

So far the description of the turret lathe disclosed herein has referred to conventional structure and since it is well known in the art has been but briefly described. It will be understood that the work spindle 40 in the head stock 39 may be driven at different speeds of operation in the different operative steps of a complete operative cycle for the production of a work piece, and that suitable change speed gearing is arranged in the head stock for the purpose of imparting the various speed changes to the work spindle.

Preferably the prime mover for the machine is an electric motor 44 (see Fig. 1a) which has, in this instance, high and low ranges of operation, which motor is operatively connected to the machine by means of a suitable pulley 44a secured to the motor shaft, and a belt 44b extending around said pulley and around a pulley 45a fixed on a shaft 45 which is rotatably mounted in the head stock 39. Referring to Fig. 15 (Sheet 6 of the drawings), it will be seen that the shaft 45 is provided with two spaced clutch members 45b and 45c freely rotatable on the shaft, while a shiftable clutch member 45d is splined to the shaft to rotate therewith and slide thereon and is located intermediate the clutch members 45b and 45c, wherefore said clutch member 45d can selectively be moved into clutching engagement with the member 45b or the member 45c to cause said members to rotate with the shaft 45, or said shiftable member 45d can be moved to an intermediate position, where it is disengaged from both of the previously mentioned clutch members. The clutch member 45b has formed thereon a gear 45e, while the clutch member 45c has formed thereon a gear 45f. The gear 45f constantly meshes with a gear 46a fixed to a shaft 46, rotatably mounted in suitable bearings in the head stock, wherefore when the shiftable clutch member 45d is engaged with the clutch member 45c the shaft 46 will be driven by the shaft 45 in a direction to impart forward rotation to the work spindle. The gear 45e constantly meshes with an idler gear 45g, which, in turn, constantly meshes with a gear 46b fixed to the shaft 46, wherefore when the shiftable clutch member 45d is engaged with the clutch member 45b the shaft 46 will be rotated in a direction to impart reverse rotation to the work spindle 40.

Intermediate the gears 46a and 46b a three-step gear cone is mounted on the shaft 46 and is splined thereto so as to be shiftable axially thereof but to rotate therewith, said gear cone comprising the gears 46c, 46d and 46e. The gear 46c is adapted to be meshed with a gear 47a fixed to a shaft 47 rotatably mounted in the head stock, while the gears 46d and 46e are adapted, respectively, to be meshed with gears 47b and 47c also fixed to the shaft 47. It will be seen that through the gearing referred to, the shaft 47 can be driven from the shafts 45 at any one of three different speeds and in opposite directions. The gear 47c constantly meshes with a gear 40a, integrally formed on a sleeve 40b, which is freely rotatable between suitable shoulders on the work spindle 40. The gear 40a is adapted to be meshed with a gear 48a of a two-step gear cone, which is splined to a shaft 48 to rotate therewith but to move endwise thereof, said two-step gear cone also having a gear 48b which is adapted to mesh with a gear 40c integrally formed on the sleeve 40b.

It will be seen that the shaft 48, through the gearing heretofore described, can be driven by the shaft 45 at any one of six different speeds and in opposite directions. The shaft 48 is also provided with a second two-step gear cone splined thereto to rotate therewith and move endwise thereof, which two-step gear cone comprises a gear 48c adapted to be meshed with a gear 40d fixed to the work spindle 40 and a gear 48d adapted to mesh with a gear 40e also fixed to the work spindle. It will be seen that the work spindle 40 through the gearing described can be driven by the shaft 45 in opposite directions and at any one of twelve different speeds. It will be remembered that the motor 44 is capable of operating at either high or low speed ranges, wherefore it will be apparent that the pulley 45a can be driven at two different speeds by the motor 44, and hence the work spindle can be driven in opposite directions at a high series and a low series of speeds of twelve speeds each for a total of twenty-four different speeds. The work spindle 40 also has fixed thereto a gear 40f which through suitable gearing, not shown, drives the feed shaft 41 in timed relation therewith.

The shifting of the shiftable clutch member and the three and two-step gear cones, just above described, is effected by means illustrated in Figs. 11 and 12 (Sheet 4) and Figs. 13 and 14 (Sheet 5) of the drawings.

The shifting of the gear cones is illustrated in this instance as being effected by means of a preselecting mechanism, such as is shown in the copending Lange application, Serial No. 8,319, but it should be understood that the invention, insofar as certain phases thereof are concerned, could be applied to machine tools employing the conventional selective gear shift.

The shiftable clutch member 45d is moved by means of a fork 49a engaging a groove in the member and integrally formed as a part of a sleeve 49, slidably carried by a rod 49b, supported in suitable brackets in the head stock 39. The slide 49 is provided with two upstanding spaced lugs, see Fig. 13, between which operates the rounded end of a lever 50a secured to the lower end of a vertically extending shaft 50, which is rotatably mounted in the cover 39a and extends upwardly beyond the upper side thereof and is provided with an enlarged portion. The main control lever 51 for the work spindle 40 is pivotally connected to said enlarged portion of the shaft 50, wherefore when said lever is rocked horizontally the shiftable clutch member 45d can be moved into either of its two operative positions or into its inoperative position. The main control lever 51 may also be rocked on its pivot in a vertical plane for a reason later to be explained and in a manner such as is shown in the above mentioned Lange application Serial No. 8,319. The three-step gear cone on the shaft 46 is shifted to any one of its three operative positions by means of a fork 52a straddling the gear 46d and integrally formed on a sleeve 52 which is slidably supported on the shaft 45h upon which the idler gear 45g is mounted (see Fig. 11). The sleeve 52 is provided with an upwardly and laterally extending arm 52b having at its end a forked portion in which operates the end of a lever 53a fixed to the lower end of a vertically extending shaft 53 mounted for rocking movement in the cover 39a of the head stock 39. The rear two-step gear cone on the shaft 46 is shifted to either one of its two operative positions by means of a shoe 54a, straddling the large gear 48b of the gear cone and pivotally carried by the end of a lever 54, mounted on the shaft 53 above the lever 53a for free rocking movement thereon. The front two-step gear cone on the shaft 48 is shifted to either one of its two operative positions by means of a shoe 55a carried by the end of a lever 55b, fixed to the lower end of a rockable shaft 55 carried by the cover 39a, see Fig. 12. The usual spring detents are provided for holding the levers 53a, 54 and 55b in the positions to which they have been moved.

The shaft 55 adjacent its upper end is provided with a lever 55c fixed thereto and pivotally connected at its outer end to one end of a link 55d, the opposite end of which is pivotally connected to an angular lever 55e which has its other end mounted on the shaft 53 for free rocking movement thereon. A lever arm 53b is fixedly mounted on the shaft 53 below the lever 55e for rocking movement with said shaft. The lever 53b is provided with a horizontally extending pin or finger 53c, while the levers 54 and 55e are provided with vertically extending pins or fingers 54b and 55f, respectively. It being noted that pins 53c, 54b and 55f are equally spaced radially of a common center which is the shaft 56 that extends horizontally in the cover 39a of the head stock and is mounted for rotatable movement therein. Two endwise shiftable spools 56a and 56b are splined on the shaft 56 so as to rotate therewith but move endwise thereon, which spools on their adjacent faces are provided with cooperating pairs of long and short projections and projections of equal length, as fully explained in the said copending Lange application, Serial No. 8,319.

As explained in the said Lange application, Serial No. 8,319, the spools are provided with thirty-nine cooperating pairs of projections arranged in three series of thirteen pairs each, twelve of the pairs in each series representing the twelve different spindle speeds effected by the shifting of the gear cones previously referred to, while the thirteenth pair in each series represents a neutral position of the spindle for purposes of loading and unloading the work piece, at which time the spindle is disconnected from its driving gear train.

In view of the explanation in the said Lange application, Serial No. 8,319, it will be understood that the pins 53c, 54b and 55f are located between the spools, and when the spools are moved endwise toward each other are engaged or positioned by the cooperating projections to effect a movement of the levers carrying the pins and a consequent shifting of the gear cones in the head. It will be understood that the movement of the pin 53c by the projections rocks the lever 53b and the shaft 53 to rock the lever 53a and effect a shifting of the three-step gear cone. The movement of the pin 54b by the projections on the spools effects a movement of the lever 54 and a direct shifting of the rear two-step gear cone. The movement of the pin 55f by the projections on the spools results in a movement of the lever 55e and through the link 55d a movement of the lever 55c, shaft 55 and lever 55b to effect a shifting of the front two-step gear cone to either of its two operative positions or to a position wherein it is disconnected from the work spindle. The spool 56a is moved endwise on the shaft 56 by means of a fork 57a engaging in a groove in the spool and integrally formed on a sleeve 57b, which is slidably mounted on a rod 57 fixed in the cover 39a of the head stock and located at one side and above the shaft 56. The spool 56b is moved endwise on the shaft 56 by a similar fork 58a integrally formed on a sleeve 58b which is slidably mounted on a rod 58 parallel to the rod 57 and in horizontal alignment therewith but arranged on the opposite side and above the shaft 56. The sleeves 57b and 58b are moved in unison equal distances in opposite directions upon the rods 57 and 58 to cause endwise movement of the spools away from each other or toward each other by means of an equalizer bar 59a carrying at its opposite ends shoes which work between upstanding spaced lugs on the sleeves 57b and 58b, which equalizer bar 59a is integrally formed on the lower end of a rockable shaft 59 that is carried in the cover 39a of the head stock and extends upwardly above the same.

A block 59b is secured to the upper end of the shaft 59 and has an arm 59c extending forwardly therefrom, as viewed in Fig. 11 and to which is pivotally connected a lengthwise adjustable two-part link 60, the opposite end of said link being pivotally connected to an upward extension on the lever bracket 51a which is pivotally connected to the shaft 50 and has the main control lever 51 extending forwardly therefrom. It will be seen that movement of the main control lever 51 in a vertical plane rocks the bracket 51a about its pivot in a vertical plane and acts through the link 60 connected to the bracket to rock the arms 59c and the block 59b and the shaft 59 to cause the spools 56a and 56b to move endwise toward or away from each other equal distances, it being remembered that when the lever 51 is moved in a horizontal plane a shifting of the clutch member 45d takes place, but it should be noted that said movement of the lever 51 in a horizontal plane does not affect or operate the spools 56a and 56b while the movement of the lever 51 in a vertical plane to move the spools endwise does not affect the shiftable clutch member 45d, as fully explained in the copending Lange application, Serial No. 8,319.

The shaft 56 is rotatable in opposite directions to index the spools to bring the various pairs of cooperating projections thereon into alignment with the pins 53c, 54b and 55f, so that when the spools are moved endwise toward each other certain or all of said pins will be shifted thereby to effect a shifting of one or more of the gear cones to produce different and predetermined speed changes in the operation of the spindle, the direction of shifting of said pins depending upon whether or not the cooperating pairs of projections are long or short, short or long, or of equal length, as fully explained in the said copending Lange application, Serial No. 8,319.

The shaft 56 extends beyond the end of the head and has secured thereto a dial 62 and an operating knob 62a, wherefore the shaft 56 and spools 56a and 56b can be indexed in opposite directions to bring the various pairs of cooperating projections on the spools into operative position with respect to the pins 53c, 54b and 55f for preselecting the different spindle speeds. The face of the dial 62 is provided with suitable indicia, representing the various spindle speeds and neutral or loading and unloading position of the spindle, which indicia can be selectively brought into alignment with a fixed pointer 62b to indicate when the spools have been indexed to the proper position and the desired spindle speed preselected.

Referring to Figs. 3, 5, 6 and 7 it will be seen that the cover 39a of the head stock is provided with suitable bearing brackets which rotatably support a shaft 63 that extends horizontally of the head from the front side thereof toward the rear side and is provided at its end at the front of the machine with a square portion 63a, see Fig. 6. A removable box 64 is secured to the cover 39a at the front of the machine and carries an integral bearing boss formed on a horizontal partition 64a, see Fig. 5, which boss rotatably supports a shaft 65 extending horizontally of the box 64 and axially aligned with the shaft 63, said shaft 65 being provided at its inner end with a squared socket 65a fitting the squared end 63a of the shaft 63 and at its outer end beyond the box 64 with an operating knob 65b. The shaft 65 is further provided intermediate the squared socket 65a and the bearing boss with a spiral gear 65c and adjacent the opposite end of the bearing boss with a beveled pinion 65d. The spiral gear 65c meshes with a spiral gear 66a fixed on the lower end of a vertically extending shaft 66 in the box 64 while the beveled pinion 65d meshes with a beveled pinion 67a fixed on the lower end of another vertically extending shaft 67 likewise arranged in the box 64 and parallel to the shaft 66.

It will be seen that when the shaft 65 is rotated either by the knob 65b or through the shaft 63, as will later be explained, that the vertically extending shafts 66 and 67 are rotated in the same direction, and they are both driven from the shaft 65 with a one to one ratio at the same speeds. The shafts 66 and 67 are adapted to receive flanged drums 68, the lower ends of said drums overhanging the bearing bosses for the shafts 66 and 67, while the upper ends thereof are operatively connected to the shafts by means of washers 68a having squared openings fitting squared portions of the shafts and operatively connected to the drums by pins 68b carried by the washers and adapted to be selectively inserted in a series of openings formed in the flanges at the upper ends of the drums, see Figs. 5 and 6. The box 64 is provided with a removable cover 64b, having on its underside bearing bosses to receive the upper ends of the shafts 66 and 67 and being located and held in place by pins mounted in the cover and adapted to engage openings 64c in the box. The drums 68 are adapted to have placed thereon a strip 69 of flexible material having stamped on one face thereof spaced production logs for the different operative steps in a complete work cycle for the production of a work piece, one of said production logs being illustrated in alignment with the window 64d in the box 64, see Fig. 4. A substantially L-shaped backing plate 64e is arranged in the box adjacent the window to position and guide the strip 69. It will be seen that the cover 64b of the box can be removed and the drums 68 with the strip 69 thereon positioned upon the shafts 66 and 67 with the production log for the first operative step of the complete cycle in alignment with the window 64d, after which the washers 68a can be positioned upon the squared portions of the shafts and operatively connected to the drums by the pins 68b and then the cover 64b can be again mounted and located upon the top of the box 64.

The dial having been set at neutral, i. e., the spindle disconnected from its drive, and a new work piece having been mounted on the work spindle, the operator now refers to the production log to obtain the R. P. M. for the work spindle for the first work operation in the complete cycle, after which he raises the main control lever 51 to move the preselecting spools 56a and 56b endwise away from each other, following which he turns the dial 62 to bring the number representing the R. P. M. for the work spindle in the first operative step in line with the fixed pointer 62b, and reference to Fig. 4 will show that the operator has shifted the dial in the present instance to bring the number 198 in line with the pointer in accordance with the production log.

The operator now moves the main control lever downwardly to bring the spools 56a and 56b inwardly toward each other to effect a shifting of the gear cones to obtain the spindle speed of 198 R. P. M. for the first operation, and he then moves the control lever horizontally from neutral position into forward position to engage the clutch and connect the spindle drive with the shaft 45, to start the rotation of the work spindle after which he elevates the control lever to again move the spools endwise away from each other, it being remembered that the gear cones will be held in their shifted position by the spring points previously referred to.

The work spindle now being rotated at the desired R. P. M. for the first operation, the operator will obtain from the production log information relative to the cutting operations to be performed and the tools on the various faces of the turrets to be used during the first operative step, such information in this instance showing the operation to include "rough turn", "bore", "face" and "chamfer" as shown on the lower part of the log illustrated in Fig. 4, these operations requiring the use of the tools on face #1 of the hexagon turret, faces Nos. 1 and 3 on the square turret, and the employment of square turret stop #1 as shown on the log. The log also shows that the hexagon turret will have a feed of .027 inch per revolution of the work spindle, while the square turret will have a feed for face #1 of .039 inch per revolution, and for face #3 of .012 inch per revolution of the work spindle.

The operator now shifts the levers on the aprons 37b and 38c to obtain the feeds required for the turret slide and the cross slide carriage as specified above and sets the stop roll 42 to align stop #1 with the stop rod 43, after which the machine is placed in operation for the performance of the first step in the complete operative cycle.

While the machine is operating during the first step the operator again refers to the log and obtains the information for the presetting of the R. P. M. of the work spindle for the next operative step in the cycle, which information is indicated on the log in the upper right hand corner as 81 R. P. M., as shown in Fig. 4. It will be remembered that the operator following the horizontal movement of the control lever to engage the main clutch for the forward drive of the work spindle, raised said lever to move the spools 56a and 56b outwardly, wherefore it is only necessary that he now turn the dial 62 to bring the numeral 81 in line with the fixed pointer 62b to preselect or preset the spools, so that when they are again moved inwardly toward each other at the end of the first operative step in the cycle they will effect a shifting of the gear cones to obtain the required spindle speed for the next operative step in the cycle.

Although the log strip 69 might be shifted manually by rotating the knob 65b on the shaft 65 just prior to the completion of each operative step in the complete cycle to bring the log for the next operative step into line with the window 64d in the box 64, it is preferred to obtain the shifting of the log strip automatically by a mechanism now to be described.

Referring to Fig. 3, it will be seen that the shaft 63 at its rear end has fixed thereto a beveled gear 63b, which meshes with a beveled gear 70a fixed on the upper end of a vertically extending shaft 70, which is rotatably supported in the head stock and which extends outwardly of the rear underside of the head stock through a suitable boss formed on the head stock. The lower end of the shaft 70 is rotatably supported in an elongated sleeve 70b, pressed into the opening in the boss, see Fig. 8, and rotatably supporting between a shoulder formed at the outer end of the sleeve and a shoulder formed by the boss a gear 71 having a head 71a which carries in a suitable slot formed in the head a pivoted spring pressed pawl 71b adapted to engage in a cut-away portion 70c in the shaft 70 and forming a tooth therein, wherefore, it will be seen that when the gear 71 rotates in one direction it will be operatively connected to the shaft 70, while when it rotates in the opposite direction it will merely idle on the sleeve 70b and does not rotate the shaft 70.

The boss which supports the shaft 70 has bolted thereto on its underside an elongated L-shaped supporting or guiding member 72, which supports a rack 73 that meshes with the gear 71. The rack 73 has threadedly connected to one of its ends a rod 73a which extends through an opening in a plate 72a secured to the end of the member 72 and carries between said plate and the head at the end of the rod a compression spring 73b, acting at all times to urge the rack 73 in a direction to hold its end in abutting relation with the plate 72a. The opposite end of the rack 73 has secured thereto a rod 73c, which extends along the rear side of the bed 35 and above and parallel to the rear way 26 and passes through an opening formed in a lug 37c on the rear side of the turret slide 37. The outer end of the rod 73c is provided with an abutting collar 73d. The rod 73c is of such length that just prior to the turret slide 37 reaching its most rearward position at the end of each operative step in the complete work cycle, the lug 37c abuts the collar 73d during the remainder of the rearward movement of the turret slide and endwise movement is imparted to the rack 73 against the action of the compression spring 73b, the position of the abutting collar 73d of the rod 73c after it has been moved by the lug 37c being indicated in dotted lines in Fig. 2.

It will be seen that the movement of the rack as just described, causes a rotation of the gear 71 through slightly more than a complete revolution and in a direction such that the gear and the shaft 70 are operatively connected through the pawl 71b and the shaft 70 is given a complete revolution by the moving pawl, and since the shaft 70 is connected through the gearing and shafts, previously described, to the strip drums 68 with a one to one ratio, said drums will be given a complete revolution to shift the log strip and to bring the log for the next operative step in the cycle into alignment with the window 64d in the box 64.

After the turret slide reaches its most rearward position it is automatically disconnected from its drive, as will be well understood, and in order to start the second operative step in the cycle the operator moves the main control lever while still in its elevated position, as will be remembered, horizontally to disengage the main clutch in the spindle drive and he continues to move said lever in a downward direction to bring the preselecting spools inwardly toward each other to effect a shifting of the gear cones to obtain the preselected speed for the work spindle in the next operation. After these steps have been accomplished the operator may again move the control lever horizontally to reengage the main clutch and to start the rotation of the spindle at the new preselected and desired speed for the next operation, whereupon he immediately raises the control lever to bring the spools outwardly so that he can index the same when desired to preselect the new spindle speed for the next successive operative step, which spindle speed will be shown on the newly positioned log as explained above. The operator obtains the other necessary information from the newly positioned log, and continues to operate the machine as specified in the description given above for the first operative step. It will be understood that this procedure is followed through each of the operative steps in the complete cycle and, as is well understood in the art, the production of different kinds of work pieces may require various numbers of operative steps for the complete cycle, and hence there will be as many production logs on the strip 69 as there are operative steps required in the complete cycle for particular work pieces. The strip 69 following the production log for the last operative step in the cycle is provided with the word "neutral" indicating the completion of the cycle and that the work piece must be removed and a new one mounted on the spindle and the log strip rewound in the reverse direction by the knob 65b to bring the log for operative step No. 1 into view.

Of course when the turret slide moves toward the head stock as the next operative step in the cycle commences, the rod 73c and rack 73 move under the action of the compression spring 73b until the rack 73 abuts the plate 72a carried by the member 72. As the rack 73 moves toward abutting position with the plate 72a, the gear 71 will be rotated in the opposite direction from that previously referred to, while the pawl 71b will ride idly around the shaft 70 slightly more than one revolution of the gear, wherefore the pawl will come to rest in the cutaway portion of the shaft 70 forming the tooth and will be in a position to engage with the tooth when the rack and gear are moved in the opposite direction.

It will be understood that no movement is imparted to the shaft 70 and through the associated gearing and shaft to the drums 68 carrying the strip 69 during the time that the turret slide is moving toward the head.

In Figs. 16 to 20 inclusive there is disclosed a modified form of the invention and wherein the log strip is only manually moved to position the different logs for the various operative steps in the cycle in line with the window, which positioning of the logs automatically indexes the preselecting spools to the correct position for effecting shifting of the gear cones to change the speed of the work spindle. A box 74 is bolted to the front side of the cover 39b of the head, and adjacent one end is provided with a pair of horizontal vertically spaced shafts 75 and 76 rotatably supported in bearing bosses formed in a partition 74a of the box 74 and in a plate 74b removably secured to a lateral extension lug 74c formed on the partition 74a, see Fig. 19. The upper shaft 75 is extended beyond the plate 74b and outwardly through an opening in a hinged cover plate 74d on the box 74, and has fixed thereto an operating knob 75a. The shafts 75 and 76 are provided at their inner ends with similar spur gears 75b and 76b, which intermesh with a similar spur gear 77a fixed on a shaft 77 that is rotatably mounted in the cover 39b of the head stock and extends horizontally therein at right angles to the shaft 56 which supports the preselecting spools 56a and 56b previously referred to. The shaft 77 has on its inner end a spiral gear 77b which meshes with a similar spiral gear 56c on the shaft 56. The shafts 56, 77, 75 and 76 are interconnected by the gearing referred to so as to rotate with a one to one ratio, and hence it will be seen that one turn of the knob 75a will produce one turn of the shaft 56 and the spools 56a and 56b carried thereby. The shafts 75 and 76 have fixed thereto, respectively, drums 75c and 76c with the drum 75c provided adjacent one end thereof with four equally spaced radially extending projections 75d, and as clearly shown in Fig. 17, three of these projections are relatively small as compared with the fourth projection. An endless log bearing strip 78 and later to be described in detail, extends around the drums 75c and 76d and an idler drum 79 mounted for free rotation on a sleeve 79a carried by a stub shaft 79b which extends through an elongated slot 74e in the rear of the box 74 and can be clamped in various positions of adjustment in said slot by means of a shouldered block at one end and a nut and washer at the other end, as clearly shown in Fig. 16. The endless log strip 78 will vary in length according to the number of operative steps in the complete work cycle for the production of a work piece, and such variation in the length of the log strip can be compensated for by suitably adjusting the position of the stub shaft 79b with respect to the shafts 75 and 76 or by some other similar adjusting means.

Referring to Fig. 20, Sheet 6, it will be seen that the endless log strip 78 is provided adjacent one of its edges with a series of equally spaced openings 78a and that every fourth opening in the series is substantially larger than the other openings. When the strip 78 is arranged on the drums 75c, 76c and 79 as previously referred to, the projections 75d on the drum 75c engage the opening 78 on the strip, with the three small projections engaging in the similar openings in the series, while the fourth and larger projection on the drum engages with the larger openings in the series, from which it will be seen that the distance between adjacent large openings 78a of the strip 78 is equal to the circumference of the drum 75c, and hence since the spools 56a and 56b make one revolution, as previously explained, for each revolution of the drums, it will be seen that the spaces on the strip 78 between the large openings are subdivided into twelve equal subdivisions representing the groups of projections on the spools, while the spaces in line with the large openings represent the projections on the spools for neutral, wherein the work spindle is disconnected from its drive for purposes of loading and unloading a work piece.

Logs 78b are stamped or otherwise arranged on the strip 78 in accordance with the different operative steps in the complete cycle and each log is so located that a centrally disposed double ended arrow thereon will have its right end, as viewed in the drawings, aligned with the subdivision on the strip representing the required spindle speed for that particular operative step, wherefore when the log for a particular operative step is positioned in line with the window 74f of the box 74 and with the left end of the arrow, as viewed in Fig. 18, in line with the fixed pointer 74g and bearing the letter "S" representing the word Standard, the spools 56a and 56b will be indexed to the proper position, so that when they are brought inwardly toward each other they will effect a shifting of the gear cones to produce the desired speed for the work spindle, as for example, in log #1 as shown in Figs. 18 and 20, the spools will effect a change in the spindle speed to 151 R. P. M.

The second log (log #2) is positioned in this instance with the right hand end of its double ended arrow in alignment with the subdivision representing 81 R. P. M. of the work spindle and located between the next pair of adjacent large openings 78a, and, therefore, when the drums and spool are turned by the operating knob until log #2 is in line with window 64f and the left hand end of the arrow on the log registers with the fixed pointer 74g, the spools 56a and 56b will have been indexed so as to effect a change in speed of the work spindle from 151 R. P. M. to 81 R. P. M. in this particular instance. Each log on the strip 78 will bear information similar to that explained in connection with the log on the strip 69 previously referred to, and will enable the operator to operate the machine efficiently. It will be understood that the operator after he has obtained the desired information from the log for one step, can move the log strip to bring the log for the next step into line with the window and to index the spools 56a and 56b to preset or preselect the spindle speed for the next operation in the cycle and during the previous operation therein. If desired, however, the operator can wait until the first or preceding operative step has been completed, and can then shift the log strip 78 to bring the log for the following operative step into position with the window and immediately start the operation of the machine for said next operative step, but that when this is done there is no preselecting of the spindle speeds but merely a selecting thereof since the changing or shifting of the gear cones immediately follows the indexing of the spools. The log strip 78 following the log for the last operative step in the cycle is provided with an arrow and the word "Neutral", and during the last operative step the operator presets the machine for "Neutral" with the arrow in line with the pointer 74g, for the purpose of stopping the spindle and unloading the finished work piece.

When under certain conditions it is desired to slightly increase the cutting speed for the tools in any of the operative steps in order to step up the rate of production or to decrease such cutting rate when, for example, the hardness or other characteristics of the material being worked on requires a somewhat lower cutting speed than the designated one, the operator may be instructed to position the logs so that the right hand end of the double ended arrow thereon aligns with a fixed pointer 74h, representing an increase over the normal cutting speed, or with a fixed pointer 74i, representing a decrease from the normal cutting speed, at which time the left hand end of the arrow will not be in alignment with the pointer 74g representing the standard cutting speed, it being remembered that the speeds indicated on the strip 78, Fig. 20, are substantially in geometric progression, wherefore the positioning of the arrow in line with the pointers representing the increased or decreased speeds corresponds to positioning the log and, therefore, the spools for the next higher or next lower speed on the strip. At the end of the cycle the arrow at the word "Neutral" must be positioned, however, in line with the pointer 74g to disconnect the spindle drive for the purpose of unloading and loading.

It will be noted that in the embodiment just described no dial similar to dial 62 and indicating the spindle speeds is necessary, and it will be understood that the main control lever 51 is operated and the turret slide and cross slide and stops adjusted and controlled during the operation of the machine for the different operative steps in a manner corresponding to the operation thereof, as described with respect to the first explained form of the invention.

In Figs. 21 to 24 inclusive (Sheet 8) there is disclosed a form of the invention wherein a pair of dials are operatively connected with the indexing spools and with one another, one dial bearing indicia representing the spindle speeds, when the main operating motor 44 is operating at its high rate of speed and the other dial bearing indicia representing the spindle speeds when the motor is operating at its low rate of speed.

Referring to Fig. 21, it will be seen that the shaft 56 which carries the indexing spools 56a and 56b has secured to its forward or right hand end, as viewed in the drawings and externally of the head stock, a dial 80 provided with an operating knob 80a. The opposite end of the shaft 56 beyond the rear bearing therefor in the cover 39c of the head stock has secured thereto a bevel gear 80b, which meshes with a similar bevel gear 81a fixed on the inner end of the shaft 81, which is rotatably supported in a bearing formed in the cover 39c and in a bearing carried by a bracket projecting from the cover at the front of the machine, it being noted that the shaft 81 is angularly disposed with respect to the shaft 56 and carries at its outer end a dial 81b similar to the dial 80 and provided with an operating knob 81c, the dials 80 and 81b being located adjacent each other so that an operator can read the indicia and operate the knobs of both dials from a single position.

It will be seen that rotation of either dial 80 or dial 81b by their respective operating knobs effects a rotation of the shaft 56 and an indexing of the spools 56a and 56b to preselect the desired spindle speed for an operative step in the complete work cycle. As previously stated, one of the dials can be provided with indicia representing the spindle speeds when the motor 44 is operating at its high range of speed, this being the dial 81b in the present instance, while the dial 80 bears indicia representing the spindle speeds when the motor is operating at its low range of speed.

It will be understood that in the production of certain work pieces the different operative steps to be performed on the work piece will require spindle speeds, certain of which will lie in the low speed range and others in the high speed of the motor and that it is necessary for the operator to change the speed of operation of the motor for the different operative steps from high to low or from low to high, as the case may be.

Referring to Figs. 23 and 24, it will be seen that a switch box 82 is provided on the head and carries the customary switch mechanism for controlling the relay coils which control the high speed, low speed and stopping of the motor 44. Reference to Fig. 24 will show that a signal light 82a is connected with the motor circuit so as to be illuminated when the motor is operating at high speed while a second light 82b is connected with the circuit to be illuminated when the motor is operating at its low speed. Likewise it will be noted that when the motor is stopped the circuits of both lights are opened and said lights are not functioning. The lights 82a and 82b are mounted in suitable sockets formed in fixed pointer attachments 82c and 82d located, respectively, above the dials 81b and 80 and adapted to have the numbers of the indicia on the dials representing the desired spindle speeds brought into alignment with the pointers thereof. It is proposed to mount on the dials at the speeds required for the different operative steps in the cycle clip members bearing numbers representing the operative steps since it may be difficult for the operator to memorize the speeds required for the various operative steps in the complete cycle particularly in those cases where there are many operative steps in the cycle. The clips are indicated by the numeral 83. While they may be in various forms they are illustrated in this instance as formed of spring steel and having on one end a hooked portion which can be positioned over the periphery of the dial and will engage an annular grooved formed on the rear face of the dial as clearly shown in Fig. 22, so that the clips will be firmly held in position on the dial. In the present instance the clip representing the first operative step in the cycle and bearing the number 1 is shown in Fig. 23 as located adjacent the numeral 68 on the dial 81b, which is the spindle speed required for the first operative step.

The operator in commencing a new cycle then turns the dial 81b to bring the clip No. 1 into registry with the pointer on the pointer attachment 82c to preselect the spindle speed and press the proper button of the switch to illuminate the light above the dial 81b (the light 82a) and to start the operation of the motor. During the movement of the dial 81b to bring the clip No. 1 into registry with the pointer, the dial 81 will turn through a similar arc.

During the first operative step the operator notes upon which dial clip No. 2 is located and turns such dial to bring said clip No. 2 into line with the pointer above the dial to preselect or preset the spools 56a and 56b to effect a change in the spindle speed at the commencement of the second operation, it being understood that the said spools have been moved outwardly by the main control lever prior to the turning of the dial as hereinbefore explained. The operator will also notice that the clip No. 2 is located beneath the signal light which is not illuminated, and hence will know that when the first operative step has been completed, it will be necessary to change the speed of operation of the motor, and therefore he will press when the time arrives the proper button of the motor control switch to cause an illumination of the light above clip No. 2, and to extinguish the light above clip No. 1, thus changing the speed of the motor.

The operator will continue the operation of the machine as above explained, it being understood that when the clips for two successive operative steps are on the same dial the operator will not have to press any of the switch buttons to change the motor speed.

It will be seen that by the arrangement just referred to it will at all times be visually indicated to the operator whether or not the motor speed should be changed from high to low, or low to high speed for the particular operative step, and will obviate the danger of the operator operating the machine while under the impression that the motor is running at low speed when as an actuality it is running at high speed, which would increase the cutting speed of the tool to twice that at the low speed operation of the motor and hence might damage the cutting tools.

It will be understood that although the form of the invention just described has been shown in connection with the use of two dials bearing independent series of indicia representing spindle speeds for the high and low speed operation of the motor, that this form of the invention could be used in connection with machines employing a single dial bearing two sets of indicia representing the high and low speeds of the motor, as, for example, in the machine shown in the copending Lange application, Serial No. 8,319 and the copending Lange and Van Hamersveld application Serial No. 15,182, it being understood that the signal lights could be arranged adjacent the dial so that the operator could visually tell if the motor were operating at the desired speed of operation.

Reference to Fig. 24a, Sheet 4, should be had in connection with a slightly modified form of the invention wherein two signal lights are employed, but with a single dial that is operatively connected to the spools 56a and 56b and is located on the shaft 56 and bears two sets of indicia representing different spindle speeds, one set showing the spindle speeds when the motor is operating at high speed and the other set showing the spindle speeds when the motor is operating at low speed for the same dial setting. The dial 84 is shown in Fig. 24a as bearing circumferentially spaced lines which are to be registered with the pointer 84a and on the left hand side of each line appears the spindle speed for the high speed operation of the motor while on the right hand side thereof appears the spindle speed for the low speed operation of the motor. The clips 83 representing the different operative steps can be secured to the dial as previously explained, and will be located at one side or the other of the division lines on the dial and above the particular spindle speed for the high or low speed operations of the motor as the case might be. The operator in starting a work cycle will turn the dial 84 to bring the division line adjacent clip No. 1 into line with the pointer and as the clip stands to the right or low motor speed side of the division line, as illustrated, the operator will know that the low button of the motor control switch must be actuated to start the operation of the motor at its low speed. In order to provide a visual indication of the speed at which the motor is operating the pointer 84a carries two sockets provided with signal lights 84b and 84c, the former being located at the right hand side and connected in the circuit for the low speed operation of the motor, while the latter light 84c is located at the left side of the pointer and is connected in the circuit for the high speed of the motor.

During the first operative step the light 84b is illuminated as the motor is running at low speed and the operator turns the dial 84 to bring the division line adjacent clip No. 2 into line with the pointer to preselect the spindle speed for the second operation. The operator can similarly note that since clip No. 2 is at the left hand side of the pointer, the second step will require a high speed operation of the motor, and hence at the completion of the first operative step he will actuate the high speed button of the motor control switch to change the speed of the motor from low to high and to extinguish the light 84b and illuminate the light 84c.

In Figs. 25 and 26 there is disclosed a two-part dial which is mounted on the shaft 56 and comprises a dial disk 85 fixed to the shaft and having a skirt-like portion 85a extending toward the right, as viewed in the drawings, and keyed to the shaft 56. The disk 85 is provided adjacent its circumference with a plurality of circumferentially spaced openings 85b adapted to have removably fitted therein shouldered pins 85c. The outer dial part is a cup-shaped member 86 having a centrally disposed sleeve-like portion 86a which is slidably mounted on the skirt-like portion 85a of the dial disk 85 and is splined thereto so that the disk 85 and the member 86 will rotate together. The circumference of the member 86 is provided with suitable indicia indicating in this instance the spindle speeds for the high and low speed operation of the motor.

The shaft 56 is extended through the plate 85 and the member 86 and outwardly of the latter where it has a reduced threaded portion adapted to receive a clamping and operating knob 87 which acts, when screwed upon the reduced portion of the shaft, to hold the member 86 in assembled relation with the disk 85. The knob 87 may be provided and is so illustrated with a conventional lock indicated at 87a and wherein the lock pin when turned to locking position engages in a groove formed in the end of the reduced portion of the shaft 56 to prevent the unscrewing of the knob 87 from the shaft for reasons later to be explained.

Clips 88 similar to the clips 83 previously described are mounted on the member 86 to indicate the spindle speeds for the different operative steps for the cycle. In positioning the clips upon the member 86 the latter is moved away from the disk 85 by unscrewing the knob 87 after the lock bolt of the lock 87a has been unlocked, and the clips are then positioned upon the member according to the desired spindle speeds for the different operative steps. While the member 86 is still in the position to which it has been moved outwardly away from the disk 85, pairs of pins 85c are inserted in the openings 85b of the disk 85 in such positions that when the member 86 is moved toward the disk to its fully assembled relationship therewith, the curved portions of the clips will lie between the pins of each pair, and hence when the knob 87 has been screwed onto the shaft 56 and locked thereon the clips cannot be shifted circumferentially of the member 86 and cannot be removed due to the small clearance between the disk 85 and member 86, and hence are locked in place against unauthorized change by the operator.

It will be seen that the machine can be set up for production purposes to operate at specified spindle speeds in the different operative steps and that the operator cannot make any unauthorized changes in the spindle speeds for the different steps in the operation. If the operator should position the dial so as to operate the machine contrary to the spindle speeds provided for by the location of the clips, this fact will be readily discernible to an inspector or foreman or other person in authority.

The two sets of indicia on the member 86 are arranged with the spindle speeds for the high speed operation of the motor and with the spindle speed for the low speed operation of the motor for the same dial setting, so that the clips 88 can be positioned at one side or the other of the dividing line between the numbers of each pair to show if the motor is to operate at high speed or low speed. In case two of the operative steps in the cycle should require the same spindle speed, as for instance, operative steps No. 2 and No. 4 as shown in Fig. 25, two of the clips are mounted on the member 86 adjacent the pair of numbers representing the required spindle speed, and in this instance the pins 85 are spaced on opposite sides of the two clips, it being noted that the holes 85b in the disk 85 are so laid out that any particular requirement of spacing of the pins can be taken care of. It will be understood that the operator turns the dial for presetting purposes until the division line between the numbers of each pair of numbers is in alignment with a pointer 89 mounted on the front side of the cover 39d of the head stock.

In Figs. 27, 28 and 29 there is disclosed a still different form of the invention wherein the dial 90 is secured directly to the shaft 56 upon which are mounted the preselecting spools 56a and 56b (not shown in these views) and has an actuating knob 90a associated with it and with the shaft 56. The periphery of the dial is provided as in the previous forms of the invention with a series of circumferentially spaced numerals grouped in pairs, and indicating the spindle speeds for both the high and low speed operation of the motor, a division line separating the numerals of each pair with the upper numeral of each pair, as viewed in Fig. 27, representing the spindle speed for the high speed of operation of the motor while the lower numeral represents the spindle speed for the low speed operation of the motor. The dial 90 has on its face a circumferential skirt-like flange 90b which is provided with a series of circumferentially spaced axially extending circular recesses 90c of larger diameter than the thickness of the skirt 90b, wherefore said recesses are substantially in the form of slots, since there are openings on both sides of the skirt-like portion for a purpose later to be explained. Arranged concentrically with the recesses 90c and at the bottom thereof are threaded openings 90d which receive the threaded ends of screws 92. A pin 92a is mounted in the bottom of each recess and acts to locate an indicia carrying bushing 92b arranged on the body of the screw 92 in each recess (see Fig. 27) and having on its inner face a plurality of equally spaced radially extending slots 92c, there being in the present instance eight slots. The bushing 92b can be arranged and held in eight different positions by means of the pin 92a engaging in any one of the slots 92c and, since the bushing is slightly less than the diameter of the recess, it will be seen that the operator can, by his thumb and finger, grip the bushing and move the same axially of the screw 92 to disengage the pin 92a from a recess 92c, after which he can turn the bushing to a new and desired position and then move it inwardly to engage the pin 92a in a new slot 92c. The bushing is provided on its periphery and between the slots 92c with a series of numerals representing the operative steps of a complete cycle with at least one of the spaces between the slots blank. Each bushing 92b carries on its outer end a pin 92d similar to the pin 92a and adapted to engage in any one slot of a series of radially extending annularly spaced slots 93a similar in arrangement and number to the slots 92c and arranged in the bottom of a cup-shaped bushing 93 (see Fig. 28) mounted on the body of the screw 92 and arranged within the recess 90c, the diameter of the bushing 93 being the same as the diameter of the bushing 92b. A compression spring 93b is arranged within the cup-shaped bushing 93 and abuts the bottom thereof and the head of the screw 92, and acts to normally maintain said bushing in engagement with the bushing 92b and with the pin 92d entering one of the slots 93a in the bottom of the bushing 93, it being noted that the spring in addition holds the bushing 92b in the recess 90c with the pin 92 located in a slot 92c. The periphery of the cup-shaped bushing 93 between the slots 93a is provided, in this instance, with numerals representing the operative steps in a complete work cycle with at least one of the spaces blank. It will be seen that when it is desired to adjust both bushings in any one recess so as to bring certain of the numerals thereon into registry with the slot in order to be visible from the side of the dial, that the operator grips both bushings 92b and 93 and moves the same outwardly of the screw 92 against the tension of the spring 93b and then turns the bushings to locate the inner bushing 92b with the correct numeral showing, after which he allows the spring to move the bushings to seated position. He then grips only the outer bushing and moves the same outwardly of the screw 92 against the action of the spring and then turns it to bring the desired number into view in the slot and then lets the spring move the bushing inwardly until the pin 92d engages in the correct slot 93a. Ordinarily, in practice, when a certain spindle speed is employed in only one of the operative steps of the cycle, the operator adjusts the outer bushing 93 to bring the desired numeral thereon into view to serve the same purpose as did the clips 88 previously described. However, in some instances, the same spindle speed will be required for two of the operative steps in the cycle, in which event he adjusts both bushings 92b and 93c to bring the numerals of said operative steps into view as, for example, the numerals 2 and 4 located at spindle speed $$\frac{68}{34}$$

as shown in Fig. 27, it being noted that the inner bushings 92b in the other recesses are shown in this view as blank, while the other operative steps in the cycle are shown on the outer bushings. It will be understood that all bushings will show blank spaces unless they are to indicate an operative step in the cycle. The construction shown in Figs. 27 to 29 has been described so far in connection with the operation of the machine wherein only the high speed of the motor or the low speed thereof is employed throughout the complete work cycle. In some instances it will be necessary to employ both the high speed of the motor and the low speed thereof to produce the necessary spindle speeds for a complete work cycle and, in such event, the inner bushings, that is the bushings 92b, can be used, for example, to indicate those operative steps in which the low speed of the motor is employed, while the outer or cup-shaped bushings 93 can be used to locate the operative steps in which the high speed of the motor is employed. If desirable, the numbers on the dial representing the spindle speeds for the high speed operation of the motor can be colored to correspond with the color of the numerals appearing on the cup-shaped bushings, while the numerals indicating the spindle speeds at the low speed operation of the motor can be colored to correspond with the bushings 92b.

The operation of the machine employing the dial just described can be carried out as previously explained in connection with the other forms of the invention.

In Fig. 30 there is shown an arrangement employing a dial 94 similar to the dial 90 just described, and provided with recesses similar to the recesses 90c in which are arranged inner bushings 94a similar to bushings 92b and outer bushings 94b similar to the cup-shaped bushings 93. In place of the numerals appearing on the bushings in the form shown in Figs. 27 to 29, inclusive, and indicating the operative steps of the complete cycle, the bushings are provided with indicia representing the rate of feed for the cutting tools in thousandths of an inch per revolution of the work spindle for a particular operative step, while clips 95 similar to the clips 83 and 88 previously described, are mounted on the dial adjacent the numerals representing the different spindle speeds for the different operative steps in the complete work cycle.

In Figs. 31 and 32 the dial 96 fixed on the shaft 56 is provided on its periphery and adjacent its front face with a series of numbers indicating the spindle speeds for both the high and low speed operation of the motor. It is proposed to secure to the periphery of the dial 96 to the left of the series of numbers just referred to, a strip 96a upon which the operator, as he sets up the machine and tries the operation thereof upon a trial work piece, can make informative notations showing the various stops, feeds and other adjustments to be employed with the various spindle speeds in the different operative steps of the complete cycle and, in this way, there is made up on the strip 96a the information for a complete production log which the operator can subsequently follow or from which dial settings or log strips in the other forms of the invention previously explained can be developed. The strip 96a is held in position on the dial by locating the opposite ends of the strip beneath a clamping plate 96b arranged at the neutral position of the dial and held in clamping engagement with the ends of the strip by screws 96c extending into the dial, as clearly shown in Fig. 32.

The production logs in the forms of the invention shown in Figs. 21 to 32 inclusive embody the dial and indicia thereon, together with the clips, signal lights, bushings and the strips secured to the dial, while in the form of the invention shown in Figs. 1 to 20 inclusive the production logs are on the movable log strips carried by drums.

It will be understood that the invention in all or some of its forms can be utilized on machines not employing any preselecting speed changing devices but having conventional speed changing means such as step by step speed changing mechanism or variable speed hydraulic or electric motors, variable friction or belt drives, or any other similar drives wherein the speeds can be varied by a step by step or by a constant or gradual acceleration or deceleration between minimum and maximum.

It will be seen that by means of the invention herein described there is incorporated into the machine as a part thereof means to visually indicate to the operator the information necessary to enable him to operate the machine for the different steps of the complete cycle for the production of a work piece without referring to the usual lengthy and separate instruction sheet or drawing, thus increasing the operating efficiency of the machine. The operator, in operating a machine embodying the present invention, does not have to select from a mass of other information upon an instruction sheet, the particular spindle speeds and the settings of other parts of the machine for each operative step in the complete cycle, since the information required for each operative step is arranged in segregated form and visibly shown on a movable member which is operatively connected to a movable part of the machine and controls the setting of said part to bring about the required changes in the operation thereof for the different operative steps, which member necessarily is in a position so as to be under the constant observation of the operator and his supervisor.

The present invention enables the machine to be operated with a minimum reliance on the operator's memory and care in selecting from an instruction sheet the proper data for the different operative steps, inasmuch as the operator merely moves the movable member in the sequence indicated thereon and corresponding to the different operative steps in the cycle.

Although various forms, modifications and adaptations of the invention have been illustrated herein, it should be understood that the invention is not to be limited thereto since it may be susceptible of various modifications and adaptations within the scope of the appended claims.

Having thus described our invention we claim:
1. In a machine tool having movable parts, one of which is to be moved at different rates of movement in the different operative steps of a complete work cycle, relatively movable means operatively connected with another of said movable parts and including a production log comprising means visually indicating the sequential operative steps of said complete cycle and furnishing the information required by an operator to control the machine through said various steps.

2. In a machine tool having movable parts one of which is to be moved at different rates of movement in the different operative steps of a complete work cycle, relatively movable means operatively connected with another of said parts and including a production log comprising means visually indicating the sequential operative steps in said complete cycle and furnishing the information required by an operator to control the machine through said various steps, both of said means being movable in a predetermined order correlated to the operative steps of the cycle.

3. In a machine tool having movable parts and a rotatable spindle adapted to be rotated at different speeds in the different operative steps of a complete work cycle, a production log comprising means for visually indicating the sequential operative steps of said complete work cycle and operatively connected with one of said movable parts and furnishing the information required by an operator to control the machine through said various steps.

4. In a machine tool having movable parts and a rotatable spindle adapted to be rotated at different speeds in the different operative steps of a complete work cycle, relatively movable means operatively connected with one of said parts and including a production log comprising means visually indicating the sequential operative steps of said complete cycle and furnishing the information required by an operator to control the machine through said various steps.

5. In a machine tool having movable parts and a rotatable spindle adapted to be rotated at different speeds in the different operative steps of a complete work cycle, relatively rotatable means operatively connected with one of said movable parts, and means associated with said relatively rotatable means and visually indicating the different spindle speeds in relationship to the different operative steps of said complete cycle and furnishing the information required by an operator to control the machine through said various steps.

6. In a machine tool having a plurality of movable parts one of which is to be moved at different rates of movement during different operative steps of a complete work cycle, means operatively connected with another of said movable parts for visually indicating to the operator during one operative step the rate of movement to be selected for said first named part for the following operative step and including relatively movable members.

7. In a machine tool having a plurality of movable parts one of which is to be moved at different rates of movement for the different operative steps of a complete work cycle, means operatively connected with another of said movable parts for visually indicating to the operator during one operative step the rate of movement of said first named part for that step and the rate of movement to be selected for said part for the following operative step.

8. In a machine tool having a plurality of movable parts one of which is to be moved at different rates of movement for the different operative steps of a complete work cycle, relatively rotatable means operatively connected with another of said movable parts for visually indicating to the operator during one operative step the rate of movement to be selected for said first named part for the following operative step.

9. In a machine tool having a plurality of movable parts one of which is to be moved at different rates of movement during the different operative steps of a complete work cycle, relatively rotatable means operatively connected with another of said movable parts for visually indicating to the operator during one operative step the rate of movement for said first named part for that step and the rate of movement to be selected for said first named part for the following operative step.

10. In a machine tool having a plurality of movable parts one of which is to be moved at different rates for the different operative steps of a complete work cycle, movable means connected with another of the movable parts for visually indicating to the operator during one operative step the rate of movement to be selected for said first named part for the following operative step, and manually actuated means associated with said movable means for actuating the same in one direction.

11. In a machine tool having a plurality of movable parts one of which is to be moved at varying rates of movement in the different operative steps of a complete work cycle, means for changing the rate of movement of said last named part, means operable during one operative step while said last named part is moving at one rate of movement for preselecting the rate of movement thereof for the following operative step, and relatively movable means connected with another of the movable parts for visually indicating to the operator during one operative step the rate of movement to be preselected for said first named part for the following operative step.

12. In a machine tool having two movable parts one of which is to be moved at different rates of movement during the different operative steps of a complete work cycle, and relatively movable means connected with the other of said movable parts and controlled by the movement thereof for visually indicating to the operator during the rate of movement of said first named movable part in one operative step the rate of movement to be selected for said part for the following operative step.

13. In a machine tool having two movable parts one of which is to be moved at different rates of movement during the different operative steps of a complete work cycle, relatively movable means for visually indicating the rate of movement for said part for each of the different operative steps, and means operatively connected to said movable means and with the other of said movable parts for automatically moving said relatively movable means during one operative step to disclose the rate of movement of said first named part for the following operative step.

14. In a machine tool having two movable parts one of which is to be moved at different rates of movement for the different operative steps of a complete work cycle, relatively movable means having sequentially arranged thereon in spaced relation indicia indicating the different rates of movement for said part for the different operative steps of the cycle, and means operatively connecting said relatively movable means with the other of said movable parts for automatically moving said movable means one space during one operative step to disclose the rate of movement of said first named part for the following operative step.

15. In a machine tool having two movable parts one of which is to be moved at different rates of movement for different operative steps in a complete work cycle, relatively movable means having arranged thereon in sequentially spaced relation groups of indicia each of which shows the rate of movement of said first named part for the current operative step and for the following operative step, and means operatively connected with the other movable part for automatically shifting said relatively movable means during one operative step one space to disclose the next group of indicia in the sequence.

16. In a machine tool having a rotatable spindle which is to be rotated at different speeds for the different operative steps of a complete work cycle, a slide, movable means having arranged thereon spaced groups of indicia indicating the spindle speeds for the different operative steps, and means controlled by the movement of said slide for automatically moving said movable means to shift the same step by step to disclose the different groups of indicia.

17. In a machine tool having movable parts one of which is to be moved at different rates of movement for the different operative steps of a complete work cycle, rotatable drums, a strip carried by said drums and having arranged thereon in spaced relation groups of indicia indicating the rates of movement for said first named movable part for the different operative steps, and means operatively connected with another of said movable parts for rotating said drums and shifting said strip to disclose the different groups of indicia thereon.

18. In a machine tool having a part to be moved at different rates of movement for the different operative steps of a complete work cycle, a strip having arranged thereon in spaced relation groups of indicia indicating the speeds of said part for the different steps, and means for shifting said strip to disclose the different groups of indicia thereon and comprising rotatable shafts, drums upon which said strip is wound and freely rotatable on said shafts and provided at their ends with a series of circumferentially spaced openings, disks arranged on said ends of said drums, and pins for securing said disks to said drums and selectively insertible in any one of said openings, said shafts and said disks having cooperating portions forming a driving relationship therebetween.

19. In a machine tool having a spindle rotatable at different speeds in the different operative steps of the complete work cycle, a slide, movable means having arranged thereon in spaced relation groups of indicia indicating spindle speeds for the different operative steps, and means for moving said movable means step by step to disclose the different groups of indicia thereon and operatively associated with said slide, said means being active when said slide moves in one direction and inactive when said slide moves in another direction.

20. In a machine tool having a part to be moved at different rates of movement during the different operative steps of a complete work cycle, means for moving said part at a plurality of different selected rates of movement, means for selecting the different rates of movement for said part, a motor for driving said first named means and having high and low operating speeds, and means forming a production log and operatively connected to said selecting means for actuating the same and comprising relatively rotatable members, and adjustable means associated with one of said members for visually indicating the different operative steps of said cycle and the spindle speed for the high or low motor speed.

21. In a machine tool having a part to be moved at different rates of movement during the different operative steps of a complete work cycle, a high and low speed motor, variable speed means operatively connecting said part with said motor, means for varying said variable speed means to select different rates of movement for said part, and means forming a production log and operatively connected with said selecting means for actuating the same and comprising relatively movable members one of which is provided with indicia indicating the rates of movement of said part for both the high and low speeds of the motor, and means adjustably associated with said member to be positioned relative to said indicia to indicate the rate of movement of said member for high or low motor speed for the different operative steps in the cycle.

22. In a machine tool having a part to be moved at different rates of movement during the different operative steps of a complete work cycle, means for moving said part at a plurality of different selected rates of movement, means for selecting the rates of movement of said part, a motor for driving said first named means and having low and high operating speeds, a controller for the motor and including in the circuit thereof a pair of signal lights which are illuminated respectively when the motor is operated at high or low speeds, and means forming a production log and operatively connected to said selecting means for actuating the same and comprising relatively rotatable members, and adjustable means associated with one of said members for visually indicating the different operative steps of said cycle and the spindle speeds therein for the high or low motor speeds.

23. In a machine tool having a part to be moved at different speeds, a high and low speed driving motor for moving said part, a pair of movable members for selecting and effecting the speeds of movement of said part and having associated therewith indicia indicating the speeds of said part for the high and low speeds of the motor, and a motor controller including in its circuit a pair of signal lights which are arranged respectively adjacent said movable members and are illuminated selectively to indicate the high or low speed operation of the motor and which of the movable members is to be actuated to select the rates of movement for said part.

24. In a machine tool having a part to be moved at different rates, a high and low speed motor for operating said part, means for selecting the different speeds of operation for said part and including a pair of movable members, one of which bears indicia showing the speed of said part for the high speed motor operation and the other of which bears indicia showing the speed for said part for the low speed operation of the motor, a motor controller including a pair of signal lights arranged in its circuit and associated with said movable members and illuminated respectively by the actuation of the motor controller for obtaining high or low speed operation of the motor to indicate which movable member should be actuated to obtain the desired rate of movement for the movable part.

25. In a machine tool having a part to be moved at different rates, means for moving and controlling the rate of movement of said part including a high and low speed motor, a selector having thereon two sets of indicia indicating the rates of movement of said part for the high and low speed operation of the motor respectively, a controller for said motor, a pair of signal lights associated with said controller and operated thereby to indicate respectively the high and low motor speeds.

26. In a machine tool having a part to be moved at different rates during the different operative steps of a complete work cycle, means for moving and controlling the rate of movement of said part including a high and low speed motor, a selector having thereon two sets of indicia indicating the rates of movement of said part for the motor, respectively, adjustable means on said selector for indicating the rates of movement of said part for the different operative steps of the cycle, a controller for said motor, a pair of signal lights associated with said controller and operated thereby to indicate respectively the high and low motor speeds.

27. In a machine tool having a part to be moved at different rates of movement, means for moving said part and including a high and low speed motor, selector means for controlling the rate of movement of said part, a controller for said motor and including in the circuit thereof a pair of signal lights operated by said controller and indicating respectively the high and low motor speeds of the motor.

28. In a machine tool having a part to be moved at different rates of movement in the different operative steps of a complete work cycle, means for selecting the different rates of movement of said part and including relatively rotatable members, one of which is provided with indicia showing the rates of movement of said part, said last named member being provided with means rotatable relative thereto and bearing indicia representing the different operative steps in the complete work cycle.

29. In a machine tool having a part to be moved at different rates of movement for the different operative steps of a complete work cycle, relatively rotatable members for selecting the different rates of movement of said part, one of said members being provided with indicia indicating the different rates of movement of said part, and a plurality of rotatable means arranged on said last named member and bearing indicia indicating the different operative steps of the work cycle.

30. In a machine tool having a part to be moved at different rates of movement for the different operative steps of a complete work cycle, means for selecting the different rates of movement of said part and including relatively rotatable members one of which is provided with indicia indicating the different rates of movement of said part, and a plurality of rotatable means arranged on said last named member in circumferentially spaced relation and bearing indicia indicating the different operative steps of the complete work cycle.

31. In a machine tool having a part to be moved at different rates of movement in the different operative steps of a complete work cycle, means for selecting the different rates of movement of said part and including relatively rotatable members one of which is provided with indicia indicating the different rates of movement of said part, and a plurality of coaxially rotatable members arranged on said last named member and bearing indicia indicating the different operative steps of the complete work cycle.

32. In a machine tool having a part to be moved at different rates of movement in the different operative steps of a complete work cycle, means for selecting the rates of movement of said part and including relatively rotatable members one of which carries indicia indicating the rates of movement of said part, coaxially arranged members mounted on said last named member and rotatable independently of each other, and means for locking said coaxial members in predetermined relationship, said coaxial members being provided on their circumference with indicia.

33. In a machine tool having a part to be moved at different rates of movement in the different operative steps of a complete work cycle, means for selecting the different rates of movement of said part and including relatively rotatable members one of which bears indicia indicating the rates of movement of said part, said last named member being provided with a plurality of circumferentially spaced recesses having their walls slotted adjacent the periphery of said member, and relatively rotatable means arranged in said recesses and bearing indicia.

34. In a machine tool having a pair of movable parts adapted to be moved at different rates of movement in the different operative steps of a complete work cycle, means for selecting the rate of movement of one of said parts and in the form of a production log and comprising relatively rotatable members one of which bears indicia indicating the rates of movement of said last named part, adjustable means carried by said last named member and indicating the different operative steps of the complete work cycle, and means carried by and rotatable relative to said last named member and bearing indicia indicating the rates of movement of said second named part.

35. In a machine tool having movable parts adapted to be moved at different rates during the different operative steps of the complete work cycle, means for selecting the rates of movement of one of said parts and in the form of a production log comprising relatively rotatable members one of which is provided with indicia indicating the rates of movement of said last named part, adjustable means carried by said last named member and bearing indicia indicating the different operative steps in the complete work cycle, and coaxially arranged members carried by said last named member and adjustably rotatable relative to each other and bearing indicia indicating the rates of movement of said other movable parts.

MAX E. LANGE.
JOHN J. N. VAN HAMERSVELD.